UNITED STATES PATENT OFFICE.

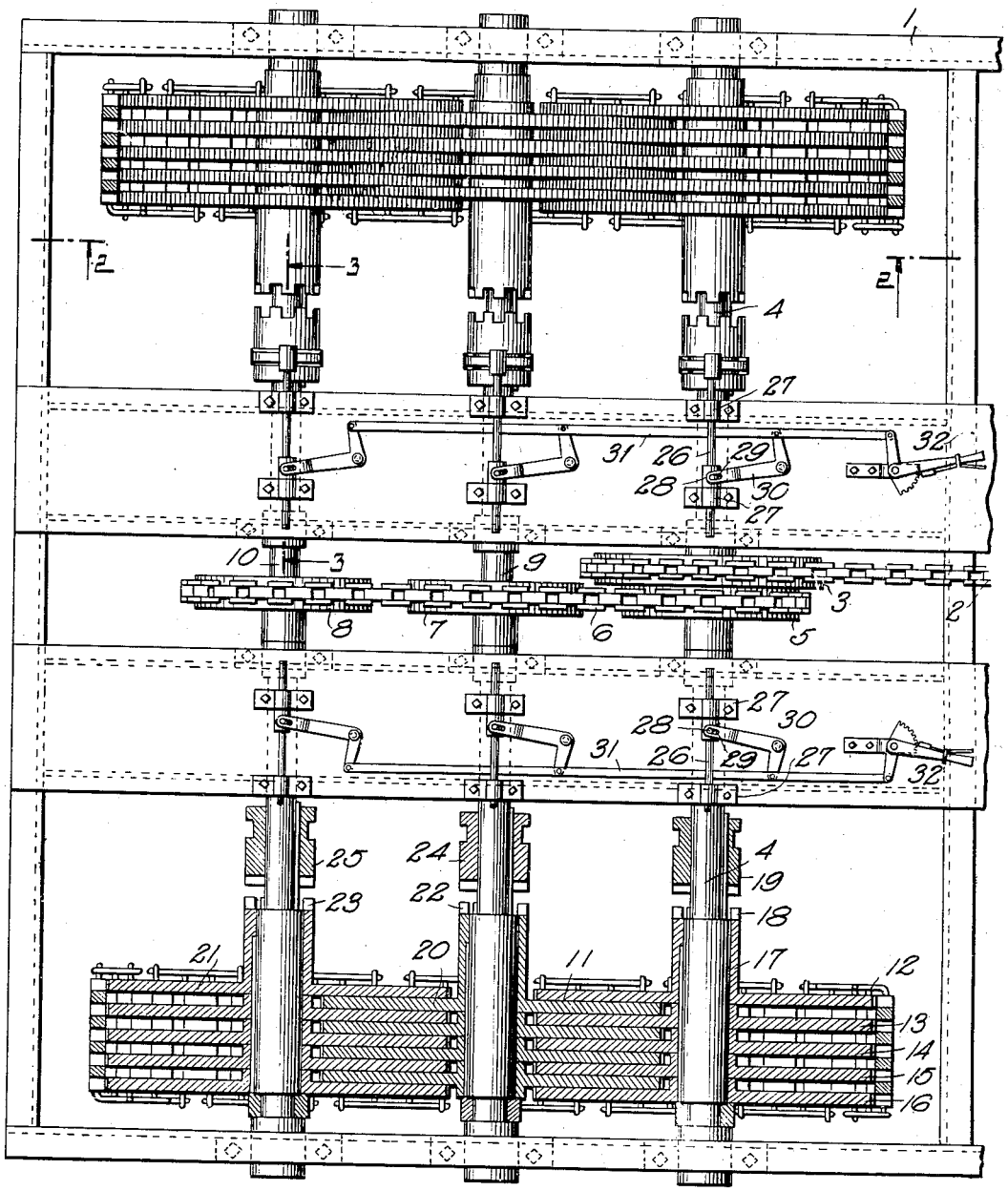

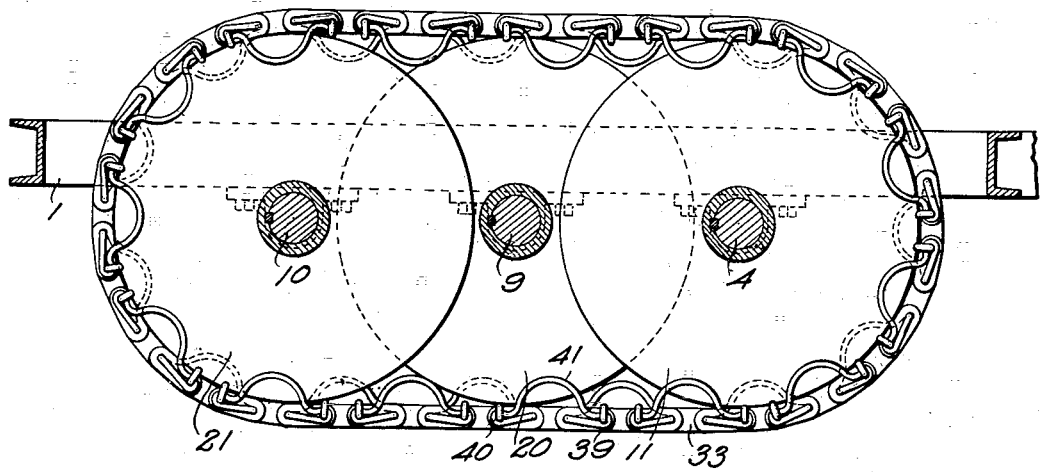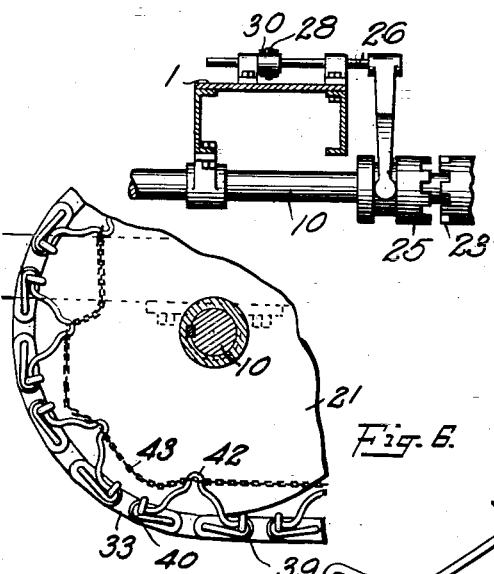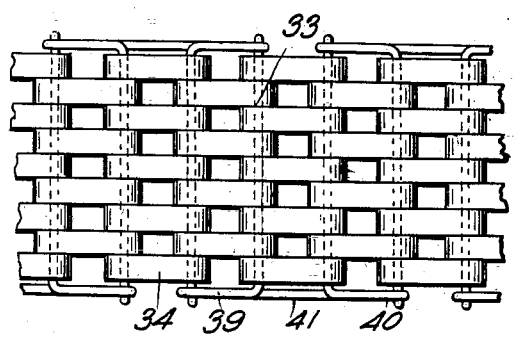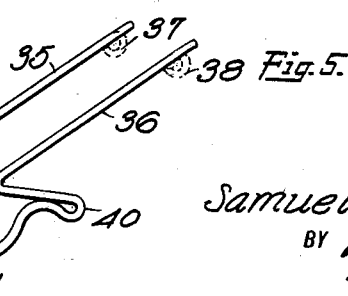

SAMUEL SYLVESTER, OF LISBON FALLS, MAINE.

TRACTION DEVICE FOR MOTOR-VEHICLES.

1,190,038. Specification of Letters Patent. Patented July 4, 1916.

Application filed October 23, 1915. Serial No. 57,533.

*To all whom it may concern:*

Be it known that I, SAMUEL SYLVESTER, a citizen of the United States, and a resident of Lisbon Falls, in the county of Androscoggin and State of Maine, have invented a new and Improved Traction Device for Motor-Vehicles, of which the following is a full, clear, and exact description.

This invention relates to traction devices for vehicles and particularly to an improved traction device for motor vehicles.

The object in view is to provide a traction device of substantially the caterpillar structure which will present enlarged gripping surfaces whereby greater power may be secured.

Another object in view is to provide a traction device wherein a plurality of series of traction wheels are used and a covering chain which forms a track or runway therefor.

In the accompanying drawings: Figure 1 is a top plan view of part of a tractor disclosing an embodiment of the invention; Fig. 2 is a section through Fig. 1 on line 2—2; Fig. 3 is a fragmentary sectional view through Fig. 1 approximately on line 3—3; Fig. 4 is a fragmentary top plan view of a traction or bearing chain; Fig. 5 is a detail perspective view of a retaining member for the chain shown in Fig. 4; Fig. 6 is a detail fragmentary sectional view similar to one end of Fig. 2 but disclosing a slightly modified form of the invention.

Referring to the accompanying drawings by numerals, 1 indicates a frame of any suitable construction provided with braces and beams of various forms for supporting the various operating structures forming the invention. The frame 1 shown in Fig. 1 may be of any length and is arranged to support an engine of any suitable kind (not shown) so as to drive the chain 2. The chain 2 engages the sprocket 3 for rotating the same, whereby the shaft 4 is rotated. A sprocket wheel 5 is rigidly secured to shaft 4 so as to drive a connecting chain 6, which connecting chain passes over sprocket wheels 7 and 8 connected to shafts 9 and 10, respectively, as shown in Fig. 1. By this structure, when the driving chain 2 is operated all of the shafts will be rotated. These shafts are mounted in suitable bearings in frame 1, the detail structure of said bearings forming no part of the present invention and therefore will not be especially described.

Loosely mounted on the shaft 4 is a set of bearing wheels 11 formed from a plurality of members, namely, the disks or plates 12, 13, 14, 15 and 16. Each of these disks is provided with a hub, disk 12 being provided with a comparatively long hub 17 having a clutch face 18 arranged on the end thereof. A sliding clutch member 19 is arranged to engage the face 18, member 19 being splined or otherwise slidingly secured to shaft 4. By this construction and arrangement whenever shaft 4 is rotating and clutch member 19 is in engagement with face 18, shaft 4 will drive the set of bearing wheels 11. A second set of bearing wheels 20 is loosely mounted on the shaft 9, while a third set of bearing wheels 21 is loosely mounted on shaft 10. The detail structure of these last mentioned bearing wheels is the same as that of the bearing wheels 11 so that no additional detailed description will be necessary. However, it will be noted that the disks or plates of all the bearing wheels are spaced apart by reason of the hub structure of the various disks so that the disks or plates of bearing wheel 20 may interlock with the disk or plates of bearing wheels 11 and 21. The size of the various disks or plates and the openings therebetween is such as to provide an easy sliding contact between the parts of wheel 20 and wheels 11 and 21 so as to reduce the friction to a minimum.

It will be observed that the wheels 20 and 21 are provided with clutch faces 22 and 23 for engaging the clutch members 24 and 25, respectively, which clutch members are splined to shafts 9 and 10. Each of the clutch members is provided with an operating rod 26, which rods pass through suitable bearing members 27. Each rod is provided with an upstanding pin 28 adapted to extend through the apertures 29 in the respective bell crank levers 30, which levers are pivotally mounted on part of the frame 1. The various bell crank levers 30 are connected by a connecting rod 31 on each side of the machine, there being shown two connecting rods 31 and associated parts in view of the fact that there is one set of wheels 11, 20 and 21 adjacent each side of the frame 1, though only one set has been described. The wheels on one side of the machine are identical with the wheels on the opposite side so that a description of one side will be sufficient for a correct understanding of both sides.

Each of the connecting rods 31 is connected with an operating lever 32, which levers may be locked in any adjusted position, namely, locked so as to hold all of the clutch members out of engagement or in engagement with the various clutch faces. Ordinarily, when the tractor is moving along, all of the clutch members are in engagement so that all of the wheels will be driven simultaneously. However, when it is desired to turn to the right the clutch members on the right side of the machine are disengaged, whereupon the bearing wheels 11, 20 and 21 on that side of the machine will cease to revolve while the other bearing wheels will continue to revolve. A turning to the left will naturally be done in a reverse manner, namely by unclutching the clutch members on the left side while allowing the wheels on the right side to revolve.

In order that a proper contact surface may be secured for the various contact wheels 11, 20 and 21, these respective wheels are corrugated or roughened on the periphery for engaging a chain 33, which chain is arranged as shown in Fig. 2 and is constructed as particularly shown in Fig. 4. It will be observed that the various links 34 of this chain are held together by rods 35 and 36, which rods are provided with eyelets 37 and 38 at one end and arms 39 and 40 at the other end, said arms merging into a downwardly bowed section 41 which acts as a guard or stop for preventing the accidental removal of the chain. From Fig. 4 it will be observed that one set of rods 35 and 36 extend from one side of the chain and the next adjacent set of rods extend from the opposite side of the chain, thus alternating for the full length of the chain. By this structure pintle members are provided for the various links 34 and guarding members are arranged on each side of the chain, said guarding members overlapping the various contact wheels 11, 20 and 21, as shown more particularly in Fig. 2. It will be observed that there will be a contact section for supporting the weight below the center of each of the shafts 4, 9 and 10 and that these contact sections are reasonably close together.

It will be evident that more than three sets of wheels could be used if desired, and if more than three sets were used additional contact sections could be provided so as to have an exceptionally good gripping action. In the ordinary caterpillar structure now in use there are provided only two wheels, namely, one at each end, so that the downward pressure is at two points on each chain, while in the present construction the aim is to provide a plurality of points for each chain, the number of points of contact being regulated by the number of wheels. By forming the wheels so that the same may overlap, as shown more particularly at the bottom of Fig. 1, a number of traction wheels may be provided within a very restricted space and thus produce a machine having great traction without producing a machine of undesirable size.

Referring to Fig. 6 it will be observed that the loops 41 are provided with extensions 42 for receiving the various chains 43 whereby these members cannot move off of the traction wheels.

What I claim is:

1. In a tractor of the character described, a frame, a plurality of shafts arranged on said frame, a traction wheel arranged adjacent each end of each of said shafts, driving means connected with said shafts for rotating the same, means for connecting said shafts with said traction wheels, and a chain mounted on the sets of traction wheels positioned adjacent each end of said shafts, said chains comprising a plurality of links and pintle members for connecting said links, said pintle members being formed with a bowed-down section overlapping said wheels, whereby the chains are prevented from accidentally moving off of the wheels.

2. In a tractor of the character described, a frame, a plurality of traction wheels, driving means connected with said wheels for rotating the same, and a chain for said wheels, said chain being formed from a plurality of links and pintles for connecting the links, said pintles comprising a pair of parallel bars merging into bracing arms and a depending loop acting as a guard for preventing the removal of the chain.

In testimony whereof I have signed my name to this specification in the presence of two subscribing witnesses.

SAMUEL SYLVESTER.

Witnesses:
ALICE C. NORTON,
CHARLES W. COOLIDGE.